UNITED STATES PATENT OFFICE.

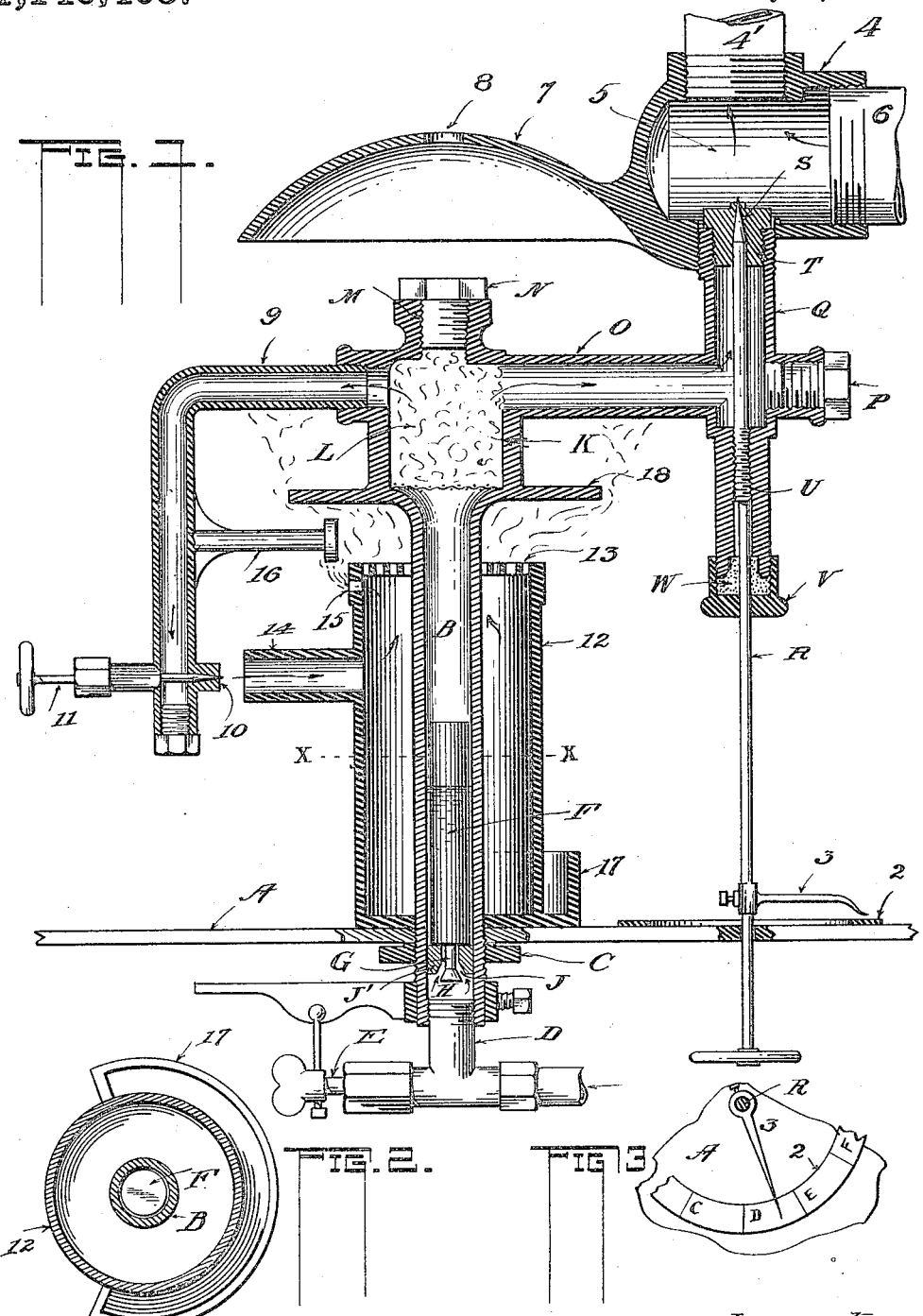

EDWARD SEITZ, OF PEORIA, ILLINOIS.

LIGHTING APPARATUS.

1,140,405.  Specification of Letters Patent.  Patented May 25, 1915.

Application filed December 12, 1910. Serial No. 597,006.

*To all whom it may concern:*

Be it known that I, EDWARD SEITZ, citizen of the United States, residing at Peoria, in the county of Peoria and State of Illinois, have invented certain new and useful Improvements in Lighting Apparatus; and I do hereby declare that the following is a full, clear, and exact description of the invention, which will enable others skilled in the art to which it appertains to make and use the same.

This invention relates to a lighting apparatus and pertains more particularly to a device for producing vapor from hydrocarbons with which to supply a system of lamps, for instance, as used in lighting stores or dwellings.

One of the objects of the invention is to provide a new form of lighting apparatus of an exceedingly simple structure that will be thoroughly efficient in operation and one that will be self regulating or automatic in its action in that the supply of hydrocarbon will be automatically regulated by the simple operation of opening and closing the discharge orifice for the vapor.

A further object of the invention is that the flow of hydrocarbon fluid into the vapor generator shall be automatically controlled by vapor pressure and that the amount of vapor formed will be automatically regulated by the simple opening and closing of the outlet for such vapor to the lamp system; but this will be more fully understood in the following specification aided by the accompanying drawing in which:—

Figure 1 is a vertical transverse section of my improved lighting apparatus. Fig. 2 is a horizontal section of a sub-burner on line X X, Fig. 1, and Fig. 3 is a plan of an indicator and scale for the lights.

A indicates a bracket or support which, for convenience, may be mounted upon a wall or shelf neither of which, however, are shown. Extending vertically through the support is a pipe B which may be threaded and provided with a lock-nut C beneath said support, for example, by which to fix said pipe in a rigid upright position. Threaded into the lower open end of said pipe B is a supply pipe D for the hydrocarbon which may be provided with any usual valve E for regulating the flow. Above the pipe D within the pipe B is a float of any approved form, indicated at F, having a stem G at its lower end provided with an enlargement or head H in the form of an inverted cone adapted to seat in a conical recess J in a member J', for example, within said pipe D through which the stem of said float extends. The upper end of the pipe B is preferably enlarged into a chamber K provided with a filling of asbestos or similar material L, both said chamber and pipe B constituting a "vapor generator". The top wall of the chamber has a threaded aperture M communicating therewith through which its interior may be reached for cleaning purposes, said aperture being closed by a suitable threaded plug N. Communicating with and extending from one side of the chamber is a tubular arm O provided at its outer end preferably with a threaded opening to receive a plug P for convenience in cleaning said arm. Communicating with said arm is a conduit Q lying at right angles thereto through which extends a needle valve R adapted to be seated in and to close an orifice S in a member T secured in said conduit; there being suitable means for providing adjustment of the needle valve, for instance the threaded portion U thereof engaging a similarly threaded part in the lower portion of the conduit, there also being a cap V at said lower portion within which is a packing W around the valve to prevent leakage of vapor.

On the support A is a ring portion 2, provided with a series of marks indicating lights to be supplied with vapor the valve R extending centrally through said ring portion and provided with an indicator, or pointer 3, but this is well known in the art and a further description is perhaps unnecessary. The orifice S constitutes, together with the member T, a nozzle for the vapor which is discharged into a member 4 secured for instance upon the upper end of the conduit Q and provided with a cavity 5 and answering as a mixing chamber; the air for the mixture being drawn in through a pipe 6 connected into said member 4, there being a pipe or conduit such as 4' connected into the member 4 opposite the nozzle for conveying the vapor to the lamp system, not shown. Cast with the said member 4 is a hollow dome-shaped member 7 provided with an opening 8, for example, said dome overhanging the vapor generator hereinbefore described. Extending laterally from said generator, besides the arm O, is a vapor conducting pipe 9 which extends downward and terminates at 10 in a discharge nozzle controlled by a valve 11. Surrounding the pipe B is a chamber created by a tube 12 whose top is covered for example, by a grating, gauze, or other suitable arrangement 13 such as is commonly employed on burners of this class, the said chamber thus created constituting a sub-burner or "generator burner". In one of the walls of said chamber is a laterally extending hollow arm 14 which communicates with the interior of said chamber and which lies opposite the said nozzle 10. Opposite the pipe 9 in the wall of the burner 12 is an orifice 15 and cast with and extending from said pipe and lying slightly above said orifice is an extension 16. Partially surrounding the said burner 12, as shown in Fig. 2, is a cup 17 for receiving fluid such, for instance, as alcohol for heating said tube.

In operation the valve E for the fluid having been opened alcohol is placed in the cup 17 and ignited. The flame is sufficient to heat the sub-burner and the pipe B so as to vaporize the hydrocarbon within said pipe. The vapor now passes into the chamber K and the pipe 9, being discharged from the nozzle 10 into the sub-burner through the arm 14 and ignited by the burning alcohol or by outside means. The flame which now burns in the sub-burner thoroughly heats the vapor generator B K, said flame being spread by means of a deflector having the form of an annular flange 18 preferably cast with the generator. This deflector acts both as a heat receiving and conducting member and to cause the heat to be thrown far out and impinge upon the pipe 9 and the arm O to keep these members well heated by causing the flame to arise around them. The hydrocarbon which arises some distance up in the pipe B or slightly above the float F at times is made very hot and caused to thus rapidly vaporize. Up to this point the valve R has been left closed but upon opening it the vapor is discharged into the conduit 4 to supply the lamps. The office of the float is that as the fluid rises within the pipe B said float will be lifted so that at a certain point the opening J will be closed by means of the conical head H of said float so as to prevent flooding of the machine. The flow of fluid is thus automatically stopped and no more will enter until the float has fallen sufficiently, due to vaporization, to once more open the passage J.

The float is but little smaller than the internal diameter of the pipe B and since the latter is kept hot by the burner, and by the hot vapor impinging upon it from the nozzle 10, the thin film of hydrocarbon lying between the float and the inner surface of the pipe will be much more readily and quickly vaporized than though a large bulk of the fluid were exposed, and the vapor will be hotter and in better condition to enter the lamp system.

I am not aware of a structure in a lighting apparatus where a float is used to control the inlet of hydrocarbon and in which the latter is let into the hot supply pipe in a thin film such as results by the structure named. I am aware of a patented carbureter for lighting systems in which is included a valve and a float to control it, and wherein, also, there is a sub-flame box surrounding the pipe or conduit in which the valve and float lie. However, whereas in my device I use a sub-burner surrounding the conduit at that point containing the float so as to more quickly and easily vaporize the film of fuel lying between the float and the walls of the pipe or conduit, and thus produce a hotter and therefore a better vapor, the device of the patent uses the said sub-flame box far above the position of the float and does not gain the advantages named.

In thus providing this automatic feature the valve R may be closed to extinguish the lights of the system while the device is in full operation and without closing the fluid valve E or changing the position of the valve 11. The valve having been closed the internal pressure of vapor will increase and this will hold the fluid back against its natural tendency to arise too high within the pipe B due to gravity if the source of supply is above the device, or due to air pressure kept upon the fluid within a pressure tank such as is very often employed. The fluid is thus prevented entering the tube E in a large bulk so that but a small amount of vapor will be formed and this finds an exit through the chamber K, pipe 9 and nozzle 10 into the sub-burner where it furnishes, by the burning thereof, sufficient heat, by a small steady flow of vapor, to keep the generator B, K hot. Now, at any time it is desired to light the lamp the valve R on being opened will place the entire system in operation the greater part of the pressure upon the fluid being removed and permitting the latter to arise in the pipe B so as to furnish a large amount of vapor. The flame of the sub-burner is thus increased in size and the vapor is more quickly formed and in amount sufficient to supply the lamp system.

In addition to heating the generator by the the sub-burner the aperture 15 in the latter emits a jet of vapor which impinges upon the member 16 extending from the pipe 9. This member is thus kept hot and heat is thus communicated to the said pipe 9 so that its metal and the vapor carried by the pipe will be thoroughly heated during all stages of the operation. The member 7 suspended above the generator receives the heat from the sub-burner and this heat is conducted to the member 4 thereby keeping said member thoroughly hot and thus insuring that the mixture therein will be thoroughly hot with little risk of the vapor becoming liquid. The device having been once adjusted for use the valve E never need be touched—merely closing or opening the valve R having control of the lamp system; the movement of the float automatically governing the inflow of hydrocarbon when the said valve R is open; the internal pressure in the generator governing the size or intensity of the flame at the sub-burner when the valve is closed. Thus the apparatus is self regulating and is always ready for instant use.

Evidently, I may make such changes in the arrangement or construction of the parts as will fall fairly within the meaning of the invention since I do not wish to be confined to the exact structure shown and described.

Having thus described my invention, I claim:—

1. In a lighting apparatus, the combination of a conduit for conveying liquid fuel including a valve-seat therein, a valve, a float carrying said valve and adapted to seat the same, a vapor generator included with the conduit, a sub-burner inclosing that part of the conduit in which the float lies and having an inlet opening in its side, and a vapor discharge pipe connected with the vapor generator and terminating opposite the said opening and adapted to discharge vapor into the same.

2. In a lighting apparatus, the combination of a conduit for conveying liquid fuel including a valve-seat therein, a valve, a float carrying said valve and adapted to seat the same, a vapor generator included with the conduit, the same having a flange extending laterally from it, a sub-burner inclosing that part of the conduit in which the float lies and terminating at its top in close proximity to the flange of the generator burner, said sub-burner having an opening in its side, and a vapor discharge pipe connected with the vapor generator and terminating opposite the said opening for discharging vapor into the same.

3. In a generating apparatus for a lamp system, the combination of a single substantially vertical conduit arranged to receive a fluid hydrocarbon, and having an enlarged upper end including a circumferential flange, and also including an outlet for vapor, a burner beneath the enlargement and flange, a pipe extending from said conduit, a part constituting a mixing chamber with which the pipe communicates, an integral extension carried on said part and overhanging the conduit and the burner, and having a cavity in its under side.

4. In a generating apparatus for a lamp system, the combination of a single substantially vertical conduit arranged to receive a fluid hydrocarbon, and having an enlarged upper end including a circumferential flange, and also including an outlet for vapor, a burner beneath the enlargement and flange, a pipe extending from said conduit, a part constituting a mixing chamber with which the pipe communicates, and an integral extension carried on said part and overhanging the conduit and the burner and having a cavity in its under side, said extension having an aperture communicating with said cavity.

5. In a generating apparatus for a lamp system, the combination of a vapor generator, a burner for heating the same, a pipe leading from the generator, a part constituting a chamber for mixing air and vapor, and an integral extension on said part overhanging the generator and the burner and provided with a concave under surface.

6. In an apparatus of the class described the combination of a generator burner, a conduit for a hydrocarbon in close proximity to and heated by the burner and having a branch for the discharge of vapor and having a second branch including a discharge nozzle opposite said burner for supplying the latter with vapor, and an extension on said second branch lying in close proximity to said burner and heated by the same.

In testimony whereof I affix my signature, in presence of two witnesses.

EDWARD SEITZ.

Witnesses:
CHAS. B. McDOUGAL,
L. M. THURLOW.

Copies of this patent may be obtained for five cents each, by addressing the "Commissioner of Patents, Washington, D. C."